ary Examiner—William R. Cline

United States Patent [19]
Belart

[11] 4,028,891
[45] June 14, 1977

[54] BOOSTER BRAKE UNIT

[75] Inventor: Juan Belart, Walldorf, Germany

[73] Assignee: ITT Industries, Inc., New York, N.Y.

[22] Filed: Nov. 7, 1975

[21] Appl. No.: 630,116

[30] Foreign Application Priority Data
Dec. 23, 1974  Germany .................. 2461295

[52] U.S. Cl. .................. 60/550; 60/562; 60/593; 60/574

[51] Int. Cl.² .................. B60T 13/16

[58] Field of Search .......... 60/562, 572, 582, 550, 60/552, 568, 548, 579, 593, 574; 91/391 R

[56] References Cited
UNITED STATES PATENTS

| 2,908,137 | 10/1959 | Spalding et al. | 60/568 |
| 3,159,974 | 12/1964 | Rodgers | 60/552 |
| 3,638,426 | 2/1972 | Belart | 60/552 |
| 3,683,619 | 8/1972 | Belart | 60/562 |
| 3,751,919 | 8/1973 | Ron | 91/391 R |
| 3,800,538 | 4/1974 | Jones | 60/562 |
| 3,808,817 | 5/1974 | Bennett | 60/550 |
| 3,844,121 | 10/1974 | Griesenbrock | 60/562 |
| 3,889,467 | 6/1975 | Huffman | 60/548 |
| 3,894,390 | 7/1975 | Belart et al. | 60/552 |
| 3,915,066 | 10/1975 | Thomas | 91/391 R |

Primary Examiner—William R. Cline
Assistant Examiner—Abraham Hershkovitz
Attorney, Agent, or Firm—John T. O'Halloran; Alfred C. Hill

[57] ABSTRACT

A hydraulic transmission is provided between the booster piston and the master cylinder piston which is automatically interrupted if the booster power is not present. In this arrangement, when booster power is not present, a sufficient pressure can be generated with brake pedal effort alone, making use of the full permissible pedal travel.

10 Claims, 2 Drawing Figures

BOOSTER BRAKE UNIT

BACKGROUND OF THE INVENTION

This invention relates to a brake unit including a master cylinder containing at least one master-cylinder piston, a booster piston the diameter of which is larger than that of the master-cylinder piston for displacing the master-cylinder piston, a pressure-control valve for controlling pressure from a power source, and a coupling between the booster piston and a brake pedal. A brake unit of this type is known from the British Pat. No. 1,105,351.

Practice has shown that it is advantageous for obtaining smoothness of operation of a vehicular brake system if the generation of an increasing braking force requires an increasing brake pedal travel. This desired dependence between generated brake pressure and pedal travel results in a brake system automatically if the brake pressure is generated in a master cylinder by the driver's pedal effort alone. If the brake pressure is generated by introducing controlled pressure from a power source, in principle only a short control travel has to be overcome to generate the full braking pressure. If it is nevertheless desired to obtain a brake-pressure responsive pedal travel, additional measures are necessary.

In the brake unit of the above-cited British Patent, a brake-pressure responsive pedal travel is obtained by rigidly coupling the brake pedal with a booster piston. The pressure-control valve is activated through lever means. While this known brake unit offers the advantage of a brake-pressure responsive pedal travel, it will have disadvantageous effects if the power source fails. As long as the power source is available, the master-cylinder piston will be displaced by the force acting on the booster piston. This force is substantially generated by the pressure from the power source. If the controlled pressure introduced is at its maximum, the displacement stroke of the master-cylinder piston is likewise very large so that the brake pedal is at its permissible maximum. If the power source fails, the master-cylinder piston can only be displaced by the driver's pedal effort alone. However, since this force is by far smaller than the force exertable by the power source on the booster piston, the master-cylinder piston can be displaced only a small amount. From this ensues that only a low pressure builds up in the brake system. The maximum permissible pedal travel cannot be made use of since the force applied to the brake pedal is insufficient.

SUMMARY OF THE INVENTION

It is the object of the present invention to provide a brake unit permitting a maximum possible brake pressure to be built up when the power source fails by making use of the whole permissible brake pedal travel, wherein a brake-pressure responsive pedal travel is created also if the system is activated with the power source intact.

A feature of the present invention is the provision of a booster brake unit comprising: a master-cylinder having a longitudinal axis; at least one master-cylinder piston having a given diameter disposed in the master-cylinder coaxial of the axis; a booster housing connected to the master-cylinder coaxial of the axis; a booster piston disposed in the booster housing coaxial of the axis for displacing the master-cylinder piston, the booster having a diameter greater than the given diameter and an actuation surface at one end thereof remote from the master-cylinder piston; a pressure source; a brake pedal; a pressure-control valve coupled between the source and the actuation surface the valve being coupled to the brake pedal to control pressure applied to the actuation surface from the source by the brake pedal; a pressure chamber disposed within the booster housing coaxial of the axis between adjacent ends of the master-cylinder piston and the booster piston for hydraulic transmission of the force of the booster piston to the master-cylinder piston; a feed chamber disposed in a wall of the booster housing; a two-position valve; and a connection within the booster housing connecting the pressure chamber to the feed chamber via the two-position valve; the two-position valve being held in a closed position by the force of a spring and the pressure of the source.

It is achieved by the design that with the power source fully operative, the master-cylinder piston becomes independent of the booster piston with respect to the piston stroke. By virtue of the fact that a pressure chamber is provided between both pistons, a hydraulic transmission results between the booster piston and the master-cylinder piston. When the power source is intact, the stroke of the master-cylinder piston is larger than that of the booster piston to which the brake pedal is coupled. If the power source fails, the hydraulic transmission between the booster piston and the master-cylinder piston becomes ineffective since the pressure fluid contained therebetween returns to the feed chamber via the two-position valve. The booster piston is in mechanical abutment with the master-cylinder piston. This permits displacement of the master-cylinder piston by the brake pedal directly. Since the stroke of the master-cylinder piston is independent of the stroke of the booster piston when the power source is used for activation, the diameter of the master-cylinder piston may be selected such that a sufficiently high brake pressure can be achieved without the power source, making use of the maximum permissible pedal travel.

Another feature of the present invention is that the pressure holding the two-position valve in the closed position is the pressure controlled by the pressure-control valve for supplying the brake unit with pressure. This has the advantage that the hydraulic transmission between booster piston and master-cylinder piston is de-activated not only in the event of failure of the power source, but also in the event of failure of the pressure-control valve, and the master-cylinder piston can be activated mechanically by making use of the maximum permissible brake pedal travel.

Still a further feature of the present invention is that the pressure chamber between the master-cylinder piston and the booster piston communicates with the feed chamber in the rest position of the brake unit. This causes the pressure chamber to be depressurized completely while the brake unit is at rest and permits the master-cylinder piston to move in the direction of the booster piston until it rests against the latter. Loss of travel between booster piston and master-cylinder piston is thus eliminated when activating the brake-unit without the power source.

A further feature of the present invention is to provide between the booster piston and the master-cylinder piston an intermediate piston which is rigidly connected with the master-cylinder piston. In such arrangement the brake unit requires but a small amount of pressure for operation. With this arrangement, it will be sufficient to use, for example, the steering pump of automobiles as the power source. The intermediate piston and the booster piston may be dimensioned without having regard to the diameter of the master-cylinder piston so that a sufficiently high brake pressure can be built up both when using the power source and when the driver's pedal effort alone is available. Still further, it is an advantage in this arrangement that the pressure fluid used for operation of the brake system and the pressure fluid used by the power source, in our case by the steering pump, are separated from one another, thus permitting the use of different pressure fluids.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
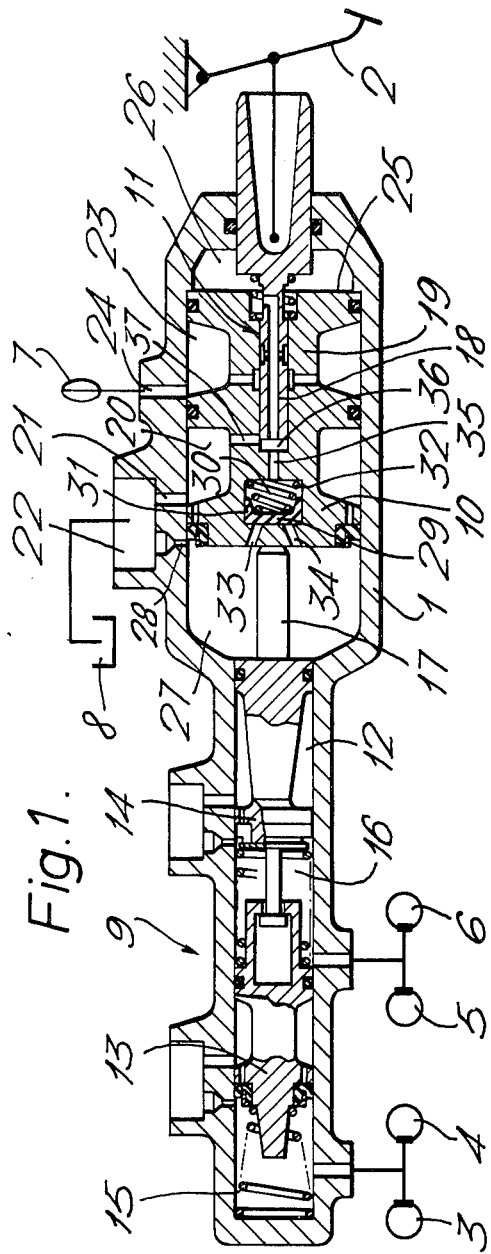
FIG. 1 is a longitudinal cross-section view of a first embodiment of the brake unit according to the principles of the present invention.

In FIG. 1, a brake unit 1 is actuatable by a brake pedal 2. Brake unit 1 serves to operate brakes 3, 4, 5 and 6 of an automotive vehicle not shown. A power source 7 is used for generating the required brake pressure. During pressure decrease, pressure fluid is allowed to flow from brake unit 1 into an unpressurized reservoir 8.

Brake unit 1 constructed in accordance with the principles of the present invention shall now be described in greater detail. It comprises a master cylinder 9, a booster piston 10 and a pressure-control valve 11. Master cylinder 9 conventionally accommodates in a longitudinal bore 12 two master-cylinder pistons 13 and 14. Master-cylinder pistons 13 and 14 conventionally displace pressure fluid from work chambers 15 and 16 to brakes 3, 4, 5 and 6. Master-cylinder piston 14 on the side closest to brake pedal 2 has an extension 17 which rests against booster piston 10 in the inactive state of brake unit 1.

Pressure-control valve 11 shall now be described. The pressure-control valve 11 has a conventional valve spool 18 rigidly connected with brake pedal 2. Valve spool 18 is slidable in a control housing 19. Control housing 19 is located in booster piston 10. For this purpose, booster piston 10 has an outer annular chamber 20 permanently communicating with a feed chamber 22 through a bore 21. Feed chamber 22 in turn communicates with unpressurized reservoir 8. Further, booster piston 10 has a second annular chamber 23 which is in permanent communication with power source 7 through a bore 24. The two annular chambers 20 and 23 are so designed with respect to their length that there is always a connection to feed chamber 22 and power source 7, respectively, irrespective of the position of booster piston 10.

On the side closest to brake pedal 2, an actuation srface 25 of booster piston 10 defines a booster chamber 26. Valve spool 18 is so designed that in the rest position of brake unit 1 booster chamber 26 is in communication with feed chamber 22 through annular chamber 20. When brake unit 1 is activated, i.e., when brake pedal 2 is depressed, this connection is first closed off. Upon further actuation, a connection between annular chamber 23 and booster chamber 26 is opened. This causes displacement of booster piston 10 to the left when viewing the drawing, thereby moving, via extension 17, the two master-cylinder pistons 13 and 14 in an actuating direction. Pressure fluid is thus fed to brakes 3, 4, 5 and 6.

An essential feature of the present invention is a pressure chamber 27 located between booster piston 10 and master-cylinder piston 14. Since the diameter of booster piston 10 is larger than that of master-cylinder piston 14, pressure chamber 27 provides a hydraulic transmission of the movement of booster piston 10 to master-cyinder piston 14. By reason of the small diameter of master-cylinder piston 14, the stroke of piston 14 will be larger than that of booster piston 10 during the displacement of the latter. It will be appreciated that in the inactive position of brake unit 1 pressure chamber 27 communicates with feed chamber 22 via a compensating bore 28.

A further essential feature of the invention lies in the arrangement of a two-position valve 29 which is either opened or closed. Two-position valve 29 is located in a cylinder chamber 30 of booster piston 10. It has a member 31, such as a sleeve seal, biassed by a spring 32 towards pressure chamber 27, thereby closing two channels 33 and 34 which lead from pressure chamber 27 to cylinder chamber 30. From cylinder chamber 30, a line 35 leads into a chamber 36 in front of valve spool 18. Via a bore 37 chamber 36 connects with annular chamber 20 and thus also with feed chamber 22.

The operation of the brake unit described is as follows: First it shall be assumed that the power source is available. By depressing brake pedal 2, the connection between booster chamber 26 and feed chamber 22 via annular chamber 20 is first closed off. Upon further depression of brake pedal 2, control pressure will be fed from power source 7 and through annular chamber 23 into booster chamber 26. This results in a displacement of booster piston 10 to the left when viewing the drawing. Booster piston 10 is thereby caused to override compensating bore 28 which leads to the feed chamber 22, after having made a short stroke. Similarly, during this initial movement, master-cylinder pistons 13 and 14 override corresponding bores in master-cylinder 9. Upon further displacement of booster piston 10 to the left when viewing the drawing, pressure fluid is urged out of pressure chamber 27. Master-cylinder piston 14 is thereby moved to the left when viewing the drawing to a larger extent than the booster piston 10. Thus, a hydraulic transmission is provided between booster piston 10 and master-cylinder piston 14. As is conventional practice with tandem master cylinders, master-cylinder piston 14 transfers the force of the pressure on floating master-cylinder piston 13 so that pressure fluid is displaced from both work chambers 15 and 16 to be fed to the brakes 3, 4, 5 and 6.

It shall now be assumed that power source 7 is not available when activating the brake unit 1. Depression of brake pedal 2 then causes valve spool 18 to move into abutment with booster piston 10 following a short pedal travel. Upon further depression of brake pedal 2, booster piston 10 is displaced by brake pedal 2 directly.

Booster piston 10 displaces master-cylinder piston 14 via extension 17. In order to be able to make use of the maximum permissible brake-pedal travel when the power source is not available for activation, it is necessary that the hydraulic transmission caused by pressure chamber 27 cease. This is accomplished by the absence of pressure fluid in cylinder chamber 30 due to the failure of the power source. A small amount of pressure in pressure chamber 27 thus permits movement of member 31 against force of spring 32 so that there is a connection to feed chamber 22 via channels 33 and 34, cylinder chamber 30, line 35, chamber 36, bore 37, annular chamber 20 and bore 21. The pressure fluid displaced in pressure chamber 27 by booster piston 10 consequently does not displace the master-cylinder piston 14 but is returned to feed chamber 22 through the connection described above.

Figure 2:
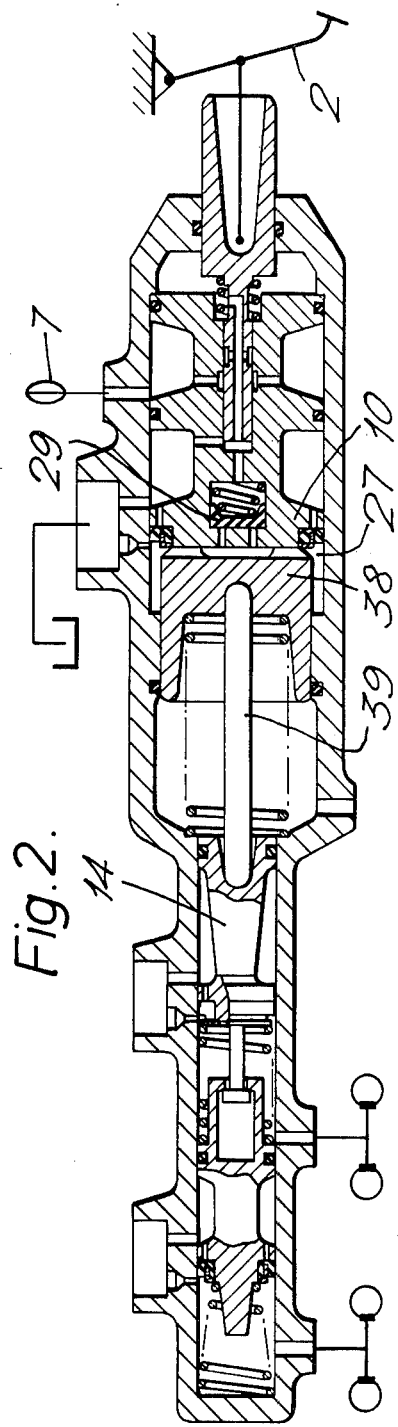
FIG. 2 is a longitudinal cross-sectional view of a second embodiment of the brake unit according to the principles of the present invention.

The embodiment of FIG. 2 differs from the embodiment of FIG. 1 only by the provision of an intermediate piston 38 disposed between master-cylinder piston 14 and booster piston 10. Intermediate piston 38 is rigidly connected to master-cylinder piston 14 by means of a push rod 39. Pressure chamber 27 is located between booster piston 10 and intermediate piston 38. All other features of brake unit 1 of FIG. 2 correspond to those of FIG. 1. Upon depression of brake pedal 2 and with power source 7 intact, pressure fluid is urged out of pressure chamber 27, thereby causing movement of intermediate piston 38 to the left when viewing the drawing. Since the diameter of intermediate piston 38 is smaller than that of a booster piston 10, it will move to the left when viewing the drawing to a larger degree than booster piston 10. Similar to the embodiment of FIG. 1, two-position valve 29 will open when power source 7 fails so that there is no longer any hydraulic transmission caused by pressure chamber 27. In this case, booster piston 10 moves into abutment against intermediate piston 38 so that master-cylinder piston 14 is mechanically displaceable. Similar to the embodiment of FIG. 1, the diameter of master-cylinder piston 14 may be selected such that a sufficiently high braking pressure can be generated with normal pedal effort when activating the system without the power source.

While I have described above the principles of my invention in connection with specific apparatus is to be clearly understood that this description is made only by way of example and not as a limitation to the scope of my invention as set forth in the objects thereof and in the accompanying claims.

I claim:
1. A booster brake unit comprising:
a master cylinder having a longitudinal axis;
at least one master-cylinder piston having a given diameter disposed in said master cylinder coaxial of said axis;
a booster housing connected to said master cylinder coaxial of said axis;
a booster piston disposed in said booster housing coaxial of said axis for displacing said master-cylinder piston, said booster piston having a diameter greater than said given diameter and an actuation surface at one end thereof remote from said master-cylinder piston;
a pressure source;
a brake pedal;
a pressure-control valve coupled between said source and said actuation surface, said pressure-control valve being coupled to said brake pedal to control pressure applied to said actuation surface from said source by said brake pedal;
a pressure chamber disposed within said booster housing coaxial of said axis between adjacent ends of said master-cylinder piston and said booster piston for hydraulic transmission of the force of said booster piston to said master-cylinder piston;
a feed chamber disposed in a wall of said booster housing;
a two-position valve; and
a connection within said booster housing connecting said pressure chamber to said feed chamber via said two-position valve;
said two-position valve being held in a closed position by the force of a spring and said pressure of said source;
said pressure-control valve including
a control housing disposed in said booster piston coaxial of said axis; and
a valve spool disposed coaxial of said axis and slideably sealed in said control housing, said valve spool being rigidly connected to said brake pedal; and
said two-position valve including
a spring-loaded member disposed in said booster piston adjacent the other end thereof coaxial of said axis, said member being in pressure communication with said pressure chamber on one side thereof and said valve spool on the other side thereof.

2. A unit according to claim 1, wherein said member is a sleeve seal.

3. A unit according to claim 2, further including a compensating bore extending radially through a wall of said booster housing between said pressure chamber and said feed chamber when said unit is in an inactive state.

4. A unit according to claim 3, further including an extension rigidly secured to an end of said master-cylinder piston adjacent said booster piston, said extension engaging said other end of said booster piston when said unit is in an inactive state and when said pressure of said source is not present when said unit is in an active state.

5. A unit according to claim 3, further including an intermediate piston disposed between said master-cylinder piston and said booster piston, said intermediate piston being rigidly secured to an end of said master-cylinder piston adjacent said booster piston.

6. A booster brake unit comprising:
a master cylinder having a longitudinal axis;
at least one master-cylinder piston having a given diameter disposed in said master cylinder coaxial of said axis;
a booster housing connected to said master cylinder coaxial of said axis;
a booster piston disposed in said booster housing coaxial of said axis for displacing said master-cylinder piston, said booster piston having a diameter greater than said given diameter and an actuation surface at one end thereof remote from said master-cylinder piston;
a pressure source;
a brake pedal;
a pressure-control valve coupled between said source and said actuation surface, said pressure-control valve being coupled to said brake pedal to control pressure applied to said actuation surface from said source by said brake pedal;

a pressure chamber disposed within said booster housing coaxial of said axis between adjacent ends of said master-cylinder piston and said boster piston for hydraulic transmission of the force of said booster piston to said master-cylinder piston;

a feed chamber disposed in a wall of said booster housing;

a two-position valve; and a connection within said booster housing connecting said pressure chamber to said feed chamber via said two-position valve;

said two-position valve being held in a closed position by the force of a spring and said pressure of said source;

said two-position valve including a spring-loaded member disposed in said booster piston adjacent the other end thereof coaxial of said axis, said member being in pressure communication with said pressure chamber on one side thereof and said valve on the other side thereof.

7. A unit according to claim 6, wherein
said member is a sleeve seal.

8. A unit according to claim 7, further including
a compensating bore extending radially through a wall of said booster housing between said pressure chamber and said feed chamber when said unit is in an inactive state.

9. A unit according to claim 8, further including
an extension rigidly secured to an end of said master-cylinder piston adjacent said booster piston, said extension engaging said other end of said booster piston when said unit is in an inactive state and when said pressure of said source is not present when said unit is in an inactive state.

10. A unit according to claim 8, further including
an intermediate piston disposed between said master-cylinder piston and said boster piston, said intermediate piston rigidly secured to an end of said master-cylinder piston adjacent said booster piston.

* * * * *